(12) United States Patent
Peterson et al.

(10) Patent No.: US 8,335,835 B2
(45) Date of Patent: Dec. 18, 2012

(54) OPTIMIZING SCHEDULING OF CLIENT APPLICATIONS IN DISKLESS ENVIRONMENTS

(75) Inventors: Nathan J. Peterson, Raleigh, NC (US); Rod D. Waltermann, Rougemont, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 443 days.

(21) Appl. No.: 12/751,162

(22) Filed: Mar. 31, 2010

(65) Prior Publication Data
US 2011/0246556 A1 Oct. 6, 2011

(51) Int. Cl.
*G06F 15/167* (2006.01)

(52) U.S. Cl. ...................................................... 709/213
(58) Field of Classification Search .......... 709/212–226; 711/147–153
See application file for complete search history.

(56) References Cited

U.S. PATENT DOCUMENTS

| | | | | |
|---|---|---|---|---|
| 5,535,375 A | * | 7/1996 | Eshel et al. | 703/27 |
| 6,751,711 B1 | * | 6/2004 | de Buda | 711/151 |
| 2010/0299512 A1 | * | 11/2010 | Maruyama et al. | 713/2 |

* cited by examiner

*Primary Examiner* — Brendan Higa
(74) *Attorney, Agent, or Firm* — Ference & Associates LLC

(57) ABSTRACT

Methods and arrangements where clients, in a diskless environment involving a storage area network, communicate to more optimally distribute the amount of disk input/output the individual clients are creating for the shared disk array.

20 Claims, 4 Drawing Sheets

OPTIMIZING SCHEDULING OF CLIENT APPLICATIONS IN DISKLESS ENVIRONMENTS

BACKGROUND

The subject matter presented herein generally relates to alternative desktop computing solutions. More particularly, the subject matter relates to centrally managed personal computer (PC) systems networked to one or more storage devices, such as a storage area network (SAN) device.

Businesses are continually concerned with cost savings and security. In the realm of IT costs, businesses are increasingly concerned with the need to reduce the costs of maintaining enterprise PCs. Moreover, businesses seek safe, secure solutions that save money without sacrificing performance. In an effort to meet such needs, various PC manufacturers have introduced thin client focused solutions, so called because the thin client relies in some regard on one or more other computer systems (for example, a SAN) in order to provide traditional PC functionality. Among other features, a thin client focused solution allows for central management and increased security. One such approach has been to virtualize the clients, relying heavily on back end servers. Another approach is the Secure Managed Client (SMC) of Lenovo.

In a diskless environment such as an SMC environment, especially one involving a SAN, an administrator may schedule applications such as antivirus, defragmentation, disk backup, etc., to launch during a predetermined time period regarded as optimal. At times, however, this may well lead to excessive disk IO (input/output) operations at the SAN disk array shared by the network, thereby disrupting performance. Solutions to this and related problems in SMC or other diskless environments have proven elusive.

BRIEF SUMMARY

In summary, one aspect provides a method comprising: assessing status of a client in a network with shared storage; conveying status related to the client; assimilating status of another network client; determining whether a task of the client satisfies one or more parameters impacting access to the shared storage; and altering one or more parameters of the task depending on whether or not the one or more parameters impacting access to the shared storage are satisfied.

Another aspect provides an apparatus comprising: a client system for a network with shared storage; the client system comprising: one or more processors; and a computer readable storage medium having computer readable program code embodied therewith and executable by the one or more processors, the computer readable program code comprising: computer readable program code configured to assess status of the client system; computer readable program code configured to convey status related to the client system from the client system to another network client; computer readable program code configured to assimilate status of another network client; computer readable program code configured to determine whether a task of the client system satisfies one or more parameters impacting access to the shared storage; and computer readable program code configured to alter one or more parameters of the task depending on whether or not the one or more parameters impacting access to the shared storage are not satisfied.

An additional aspect provides a computer program product comprising: a computer readable storage medium having computer readable program code embodied therewith, the computer readable program code comprising: computer readable program code configured to assess status of the client system; computer readable program code configured to convey status related to the client system from the client system to another network client; computer readable program code configured to assimilate status of another network client; computer readable program code configured to determine whether a task of the client system satisfies one or more parameters impacting access to the shared storage; and computer readable program code configured to alter one or more parameters of the task depending on whether or not the one or more parameters impacting access to the shared storage are not satisfied.

For a better understanding of the example embodiments, together with other and further features and advantages thereof, reference is made to the following description, taken in conjunction with the accompanying drawings, and the scope of the invention will be pointed out in the appended claims.

DETAILED DESCRIPTION

Figure 1:
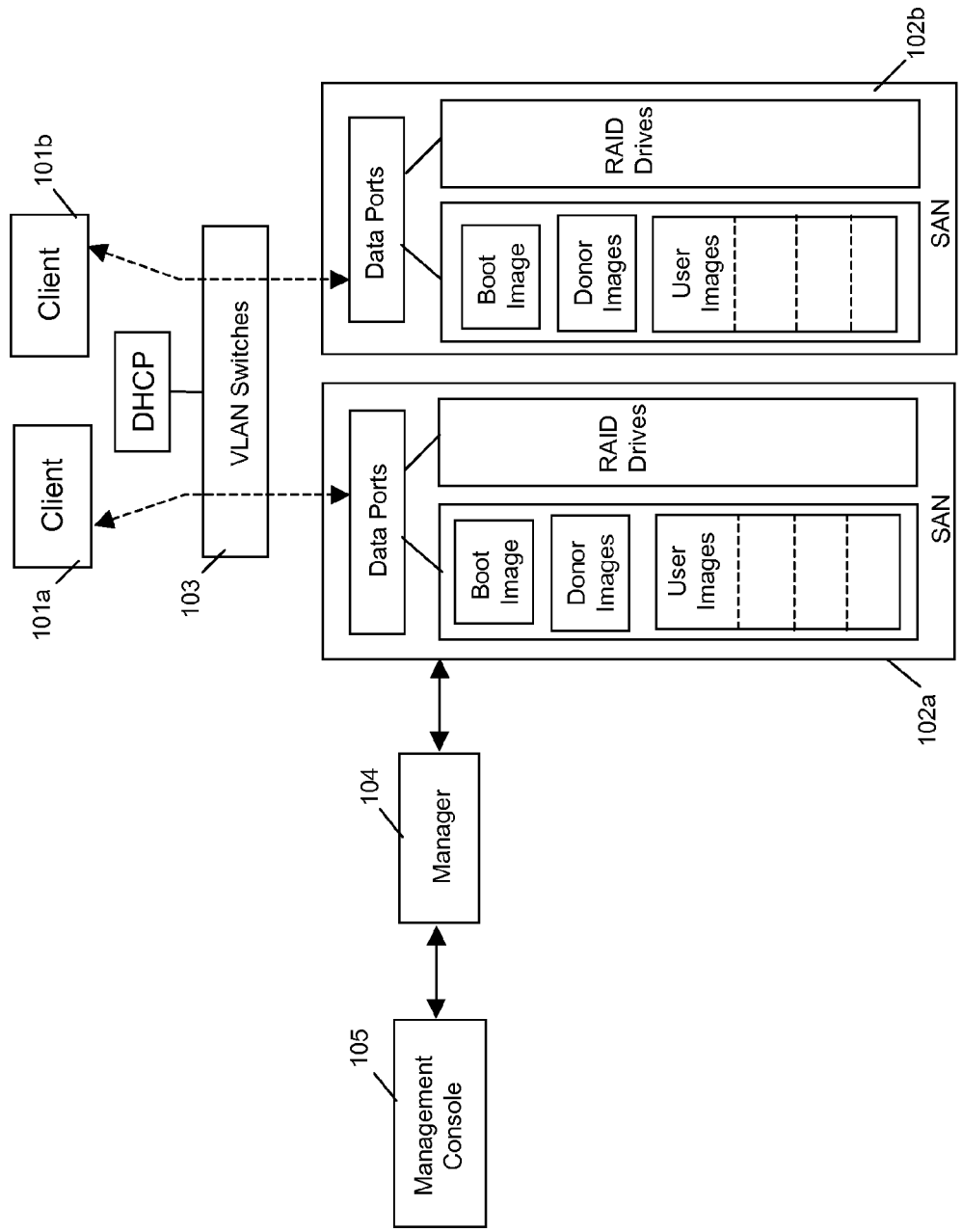
FIG. 1 illustrates an example of an alternative desktop operating environment.

In accordance with at least one presently preferred embodiment, there is broadly contemplated herein a method where clients, in a diskless environment involving a SAN, communicate amongst themselves to more optimally distribute the amount of disk IO the individual clients are creating for the shared disk array.

It will be readily understood that the components of the embodiments, as generally described and illustrated in the figures herein, may be arranged and designed in a wide variety of different configurations in addition to the described example embodiments. Thus, the following more detailed description of the embodiments, as represented in the figures, is not intended to limit the scope of the invention, as claimed, but is merely representative of selected example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of the embodiments. One skilled in the relevant art will recognize, however, that aspects of the invention can be practiced without one or more of the specific details, or with other methods, components, materials, et cetera. In other instances, well-known structures, materials, or operations are not shown or described in detail to avoid obfuscation.

The illustrated embodiments will be best understood by reference to the figures.

It should be noted that the flowchart and block diagrams in the figures illustrate the architecture, functionality, and operation of possible implementations of systems, apparatuses, methods and computer program products according to various embodiments. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As an example of an alternative desktop-operating environment, Lenovo's Secure Managed Client (SMC) provides centrally managed PCs offering superior end-user, business and IT experiences. In an example implementation, SMC utilizes a ThinkCentre® client with an INTEL® VT Processor, iSCSI (Internet Small Computer System Interface) protocol, a co-developed software stack and Lenovo Storage Array Appliance powered by INTEL®. Although SMC offers all the benefits and functionality of a thin client solution, SMC avoids sacrificing important features such as application compatibility, graphics performance, the number of desktop options available, and the like. By leveraging centralized client management, SMC makes it easier to manage and provision users and images, minimize total cost of ownership, et cetera. This is largely due to the fact that SMC eliminates the need for desk side support and lowers costs, for example costs associated with installation, change, deployment and energy consumption.

FIG. 1 illustrates a high level SMC operating environment. SMC uses high-performance network infrastructure connecting clients 101a, 101b and back-end devices (for example, SAN devices) 102a, 102b. An example implementation uses 1 Gigabit Ethernet switches 103 with Virtual LANs. The network traffic necessitated by client 101a, 101b operations is in large part due to client 101a, 101b booting, especially in the case of diskless clients such as described in co-pending and commonly assigned U.S. patent application Ser. No. 11/693, 515, entitled "DISKLESS CLIENT USING A HYPERVISOR", filed Mar. 29, 2007 and incorporated by reference here.

A manager 104 is a centralized device (server) provided for managing and maintaining the SMC system. The manager 104 can be used for example to handle user authentication from a client (for example, client 101a). The client 101a, for example, a Lenovo ThinkCentre® M58P Ultra Small Form Factor (USFF) desktop PC with INTEL® vPro™ technology, is configured for DHCP dynamic address allocation and uses a DHCP server's boot-path option to make iSCSI connections to the SAN 102a, which will boot a common user logon screen. At login, the user's Active Directory credentials are sent to the client connection web service, which authenticates the user to Active Directory and returns the information needed to boot the client 101a to the User OS on the SAN 102a. Thus, the diskless client makes an iSCSI connection to SAN 102a and boots the user image.

The manager 104 can be configured to auto-generate the iSCSI logon information, including passwords, in the background and pass information securely to a client 101a. For increased security, the user does not need to know passwords used for low-level access to the user image.

The SAN 102a is a device at which a client's 101a data is securely stored. Non-limiting SAN 102a includes an INTEL° iSCSI SAN with specialized software, configured with RAID disks and GB Ethernet ports. The SAN 102a can be managed and provisioned remotely through a Management Console 105. The Management Console 105 can be configured to generate user accounts and passwords used to access the SAN 102a.

Client 102b and SAN 102b may function similarly to client 101a and SAN 101b, respectively. Further, clients 101a/b may each employ either or both of the RAID disks (or other storage media) associated with SAN 102a or SAN 102b in accordance with determined criteria for inputting and outputting data to either or both of SANs 102a/b. While two SAN's 102a/b are shown in FIG. 1, the discussion herebelow will focus more closely on controlling the input and output of data to storage associated with just one SAN; however, it should be understood that embodiments may also broadly embrace settings in which the input and output of data to storage with two or more SANs is controlled.

Figure 2:
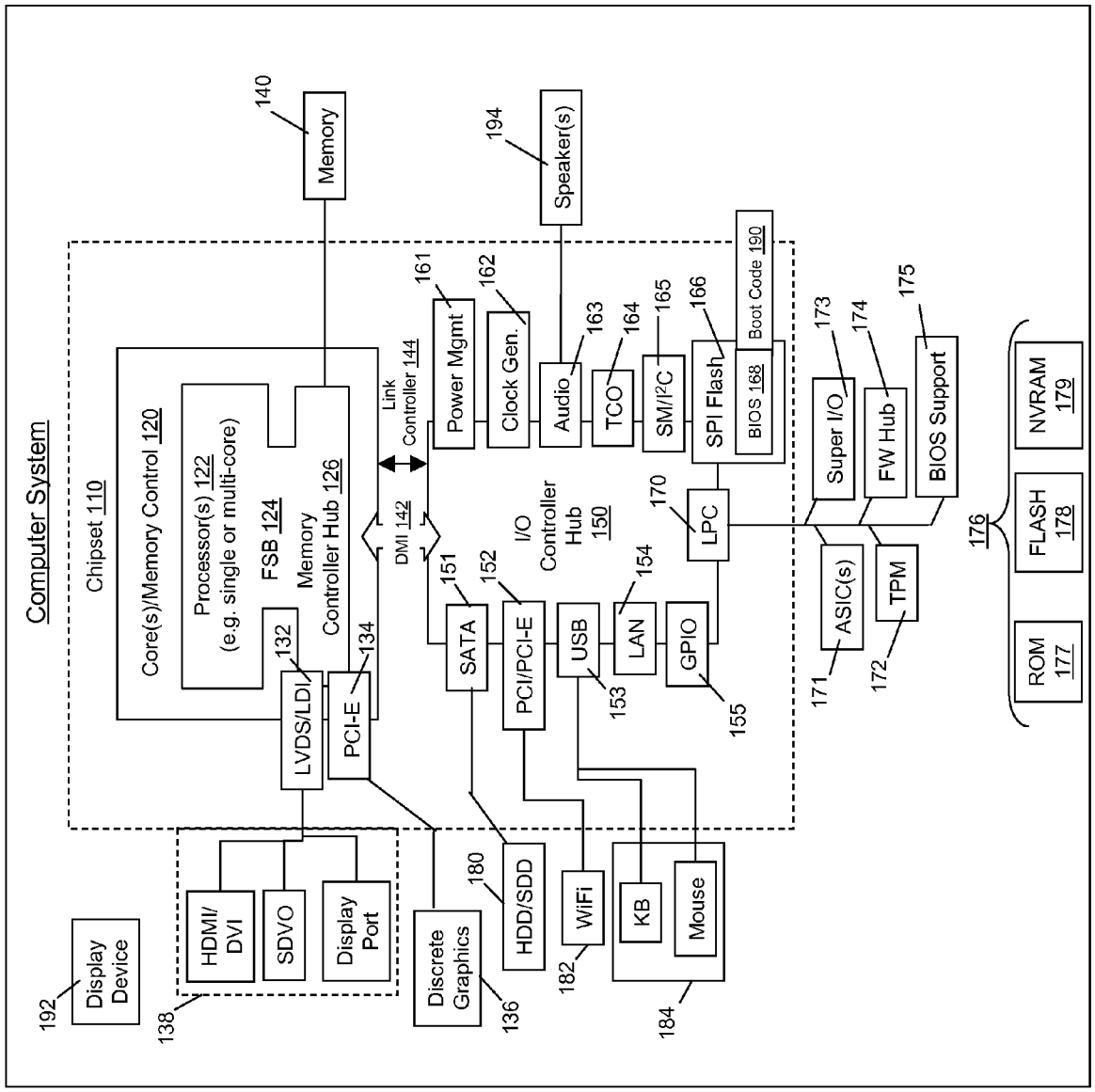
FIG. 2 illustrates an example of a computer system in which the methods described herein may be implemented.

Referring now to FIG. 2, there is depicted a block diagram of an illustrative computer system and circuitry. The illustrative embodiment depicted in FIG. 2 may be an electronic device such as a laptop or desktop personal computer, a mobile/smart phone or the like. As is apparent from the description, however, the embodiments may be implemented in any appropriately configured device, as described herein.

As such, the system of FIG. 2 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 2.

The computer system of FIG. 2 includes a so-called chipset 110 (a group of integrated circuits, or chips, that work together, chipsets) with an architecture that may vary depending on manufacturer (for example, INTEL°, AMD®, etc.). The architecture of the chipset 110 includes a core and memory control group 120 and an I/O controller hub 150 that exchange information (for example, data, signals, commands, et cetera) via a direct management interface (DMI) 142 or a link controller 144. In FIG. 2, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 2, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 2, the I/O hub controller 150 includes a SATA interface 151 (for example, for HDDs, SDDs, et cetera), a PCI-E interface 152 (for example, for wireless connections 182), a USB interface 153 (for example, for input devices 184 such as keyboard, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 2.

As mentioned heretofore, in accordance with at least one presently preferred embodiment, there is broadly contemplated herein a method where clients, in a diskless environment involving a SAN, communicate amongst themselves to more optimally distribute the amount of disk IO the individual clients are creating for the shared disk array.

Figure 3:
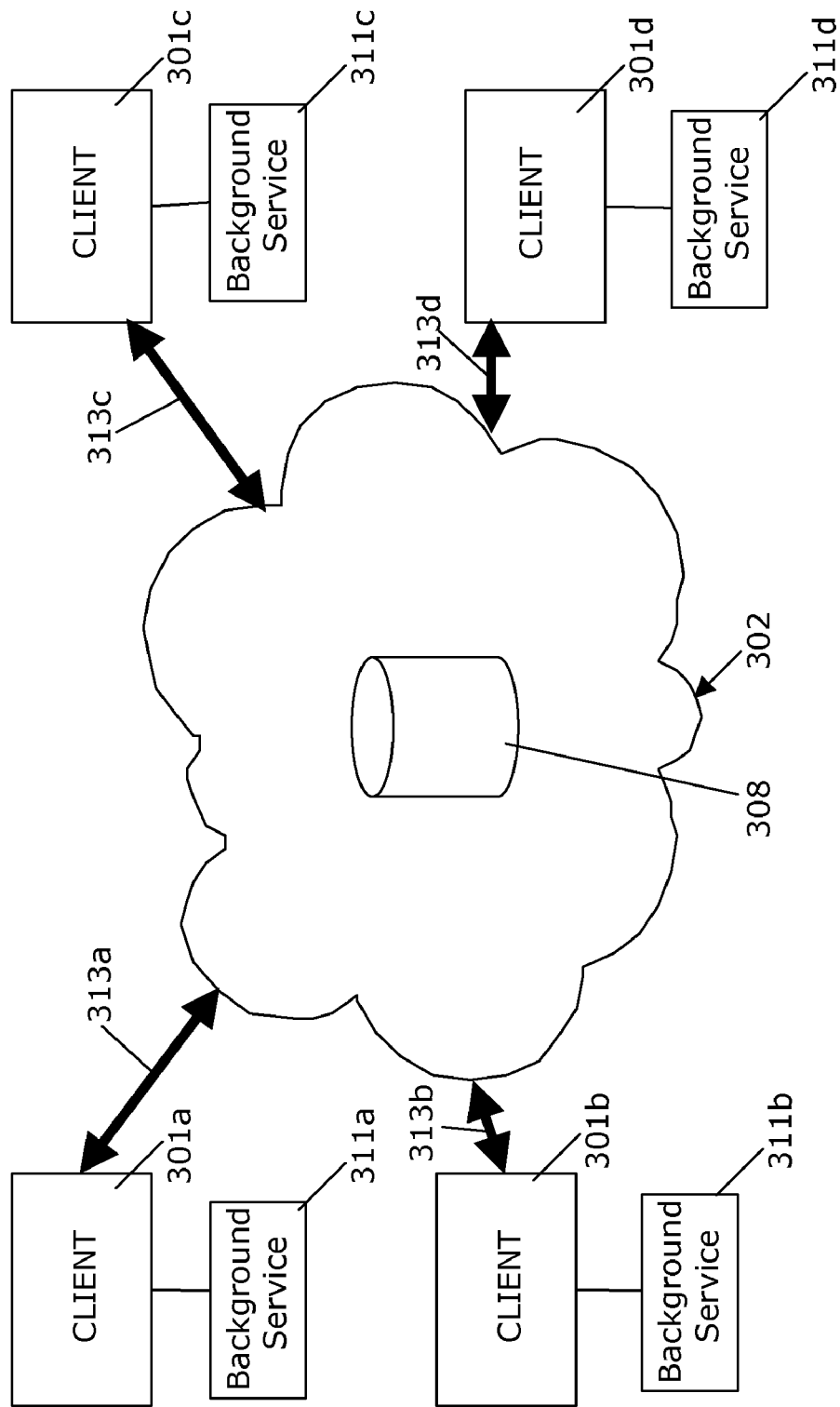
FIG. 3 shows a schematic representation of a diskless environment with a SAN.

FIG. 3 shows a schematic representation of a diskless environment with a SAN in accordance with a presently preferred embodiment. Components in FIG. 3 that essentially are analogous to components shown in FIG. 1 have reference numerals advanced by 200 with respect to FIG. 1. Alternatively, an embodiment may utilize a server (not shown).

Shown in FIG. 3 are four clients 301*a/b/c/d* which are in communication with a SAN device 302, wherein the SAN 302 serves as a network hub for communication both with and among the clients 301*a-d* and, for its part, may also constitute part of a SMC environment. Each client 301*a-d* may essentially be embodied by any computer system suited for a SMC or diskless/SAN environment as broadly contemplated herein and in FIG. 3; for instance, any or all of the clients 301*a-d* may be embodied by a computer system such as that described and illustrated herein with respect to FIG. 2. As touched on heretofore, SAN 302 may include common storage 308 for use by the clients 301*a-d*. It should be understood and appreciated that the depiction of four clients 301*a-d* is illustrative and not restrictive, and that essentially any number of clients may be involved in an environment as broadly contemplated herein in accordance with the embodiments.

Preferably, as will be more fully appreciated herebelow, each client 301*a-d* may have associated therewith a background service 311*a-d*, respectively, that runs to send and receive notifications of information such as the IO-intensive applications that are running at each client at a given time, or are scheduled, tasked or requested to be run at a current time or in the future.

Generally, IO traffic between clients 301*a-d* and SAN 302 (and thus common storage 308) may take place over conduits 313*a-d* associated, respectively, with each of the clients 301*a-d*. In a contained physical environment of high security, clients 301*a-d* and SAN 302 may be disposed in the same building, whereby conduits 313*a-d* may be embodied by hard wires or other suitable physical conduits. On the other hand, if one or more of the clients 301*a-d* is remote from a main physical environment which includes SAN device 302 and storage 308 and/or one of the other clients 301*a-d*, then any associated conduit 313*a-d* could be embodied still by a tangibly physical element and/or by a wireless connection.

Generally, in arrangements broadly contemplated herein, when a client application (e.g., scheduled application) gets launched at a client 301*a-d*, the application will preferably communicate with the corresponding background service 311*a-d* of the client to ascertain whether execution of the application can begin or whether the application needs to wait in queue based on the number of clients that are currently running the application on the same disk array. (e.g., storage 308). Alternatively, a scheduling program (such as the "ThinkVantage Away Manager" by Lenovo) can look ahead on its schedule of tasks to be run, and pre-request a position in a queue. Preferably, although the methods and arrangements broadly contemplated herein can be employed in accordance with essentially any background tasks, marked advantages may be enjoyed in connection with prescheduled background tasks such as antivirus scans and disk defragmentation.

Figure 4:
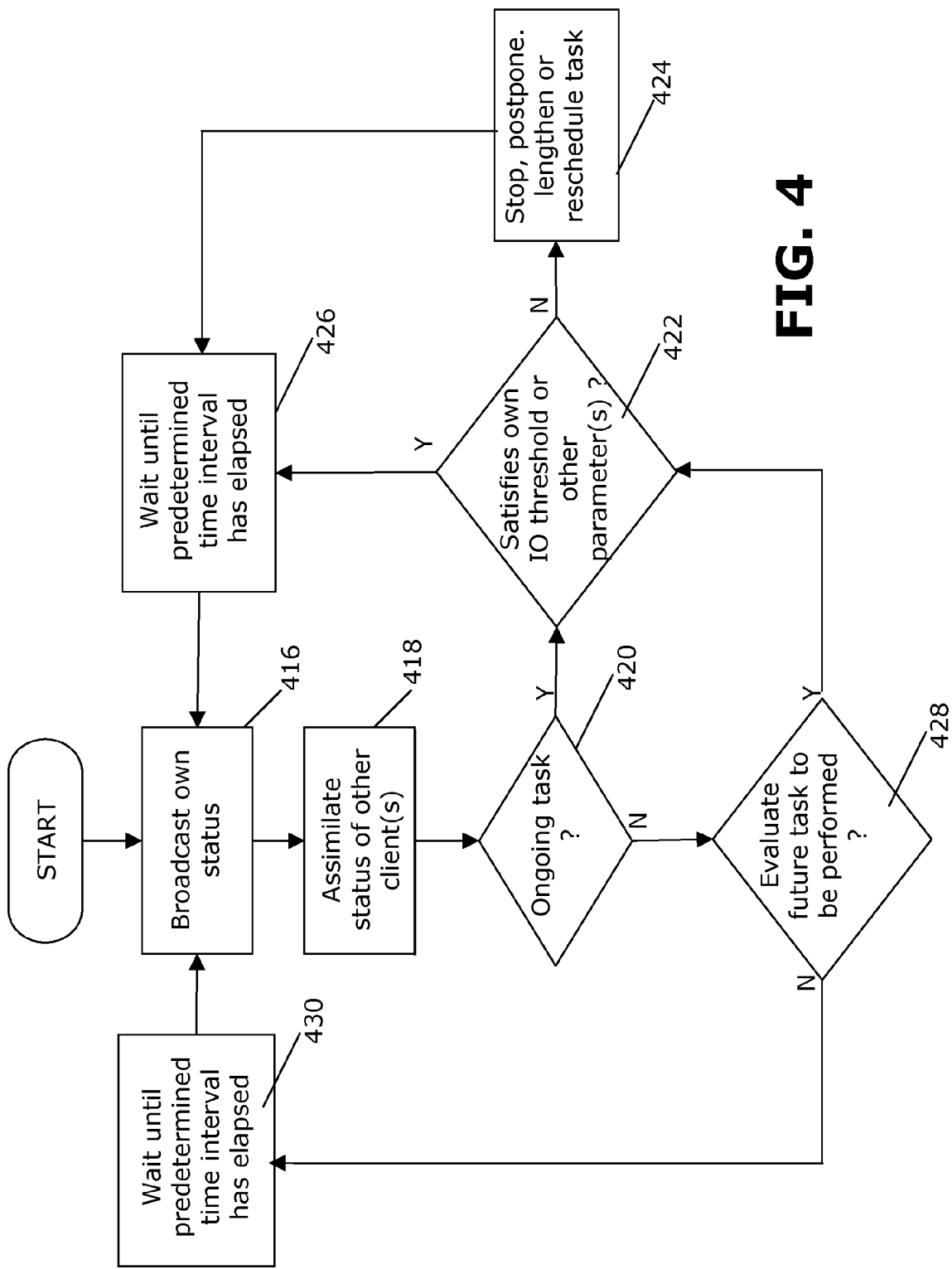
FIG. 4 provides a flowchart of a process for controlling client input/output traffic with a SAN.

FIG. 4 provides a flowchart of a process for controlling client input/output traffic with a SAN, in accordance with an embodiment.

In a first step (416), a client preferably broadcasts or otherwise conveys to other clients in (or connected to) the network its current status. Preferably, a packet could be broadcast which contains any or all of the following information (and any other suitable information): the server to which the client is connected (e.g., the name and/or IP address of the server); current (common) disk usage assumed by the client; the application(s), if any, currently running; any schedule of one or more tasks that are to be run in the future (over a predetermined time window, e.g., one or two days). Alternatively, any or all of this information may be conveyed by a client to a central server and compiled at the central server rather than distributed amongst clients. Preferably, the packet is broadcast via a background service such as one of 311*a-d* as discussed hereinabove with respect to FIG. 3. The client may also preferably receive one or more similar packets from other clients by way of assimilating the status of such clients (418), preferably via the same background service.

If (420) an ongoing task is being performed, preferably an evaluation will be made (422) if the ongoing task satisfies a predetermined IO threshold for the client and/or one or more other parameters. For example, a reasonable client IO threshold for common disk space usage may be about 20%.

If the one or more thresholds or other parameters are satisfied, then preferably a predetermined time interval will be waited out (426) until once again the client broadcasts its status to the network (416). Otherwise, preferably the task will be stopped, postponed, rescheduled or even lengthened (424). In other words, if the IO rate of the client is overwhelming the common disk space of the network, then the task could be slowed down so as to take a longer time towards completion. Otherwise the task may be stopped, to be postponed or rescheduled for resumption at a future time. Of course other parameters can be evaluated to this end, including in conjunction with the IO rate of the client, such as the server(s) to which different clients may be connected; if, indeed, the client is connected to one server while others are not, then the IO rate of the client of course may not matter so much.

If there is no ongoing task, then a future task could be evaluated for its impact on the common disk space (428). Similarly to measures taken for an ongoing task, if (422) it is determined that one or more thresholds or other parameters are satisfied for the future task, then again preferably a predetermined time interval will be waited out (426) until once again the client broadcasts its status to the network (416). Otherwise, preferably the implementation of the task will be preemptively stopped, postponed, rescheduled or lengthened (424). If there is no need to currently evaluate a future task, then a predetermined time interval can be waited out (430) before the process resumes.

In terms of the predetermined time intervals discussed hereabove, essentially any interval can be chosen between a client's broadcast of status information (416), such as every 2, 5, 10, 30 or 60 seconds.

It will be understood by those having ordinary skill in the art that the embodiments can be implemented with electronic devices with appropriately configured circuitry, such as a desktop or laptop computer system, a smart phone, a personal digital assistant and the like. A non-limiting example of a computer system is described hereinabove with respect to FIG. 2.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for particular embodiments may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to certain embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
    accessing a status of a client in a network with shared storage;
    conveying the status related to the client;
    assimilating a status of another network client;

determining whether a task of the client satisfies one or more parameters impacting access to the shared storage; and altering one or more parameters of the task depending on whether or not the one or more parameters impacting access to the shared storage are satisfied.

2. The method according to claim 1, wherein the task of the client is a background task.

3. The method according to claim 1, wherein the shared storage comprises disk space in a storage area network.

4. The method according to claim 1, wherein said assessing, determining and altering are performed by the client.

5. The method according to claim 1, wherein said conveying is performed at predetermined time intervals.

6. The method according to claim 1, wherein said conveying comprises a conveyance selected from the group consisting of a conveyance received at a server from the client and a conveyance sent from the client to another client.

7. The method according to claim 1, wherein said conveying comprises conveying information, wherein said conveyed information is selected from a group consisting of information on a task currently being run by the client, information on a future task to be run by the client, and current IO threshold information for the client.

8. The method according to claim 1, wherein said assimilating is selected from a group consisting of current operational information of another client and future operational information of another client.

9. The method according to claim 1, wherein the task comprises a current task.

10. The method according to claim 9, wherein said altering is selected from a group consisting of: stopping the task; rescheduling the task; slowing down the task; and postponing completion of the task.

11. The method according to claim 1, wherein the task comprises a future task.

12. The method according to claim 11, wherein said altering comprises rescheduling the task.

13. An apparatus comprising:
a client system for a network with shared storage;
said client system comprising:
one or more processors; and
a computer readable storage medium having computer readable program code embodied therewith and executable by the one or more processors,
the computer readable code comprising:
computer readable program code configured to access a status of said client system;
computer readable program code configured to convey the status related to said client system from said client system to another network client;
computer readable program code configured to assimilate a status of another network client;
computer readable program code configured to determine whether a task of said client system satisfies one or more parameters impacting access to the shared storage; and
computer readable program code configured to alter one or more parameters of the task depending on whether or not the one or more parameters impacting access to the shared storage are not satisfied.

14. The apparatus according to claim 13, wherein the task of said client system is a background task.

15. The apparatus according to claim 13, wherein the shared storage comprises disk space in a storage area network.

16. The apparatus according to claim 13, wherein said computer readable program code is configured to convey status related to said client system at predetermined time intervals.

17. The apparatus according to claim 13, wherein said computer readable program code is configured to convey status related to said client system via conveying a conveyance selected from the group consisting of a conveyance received at a server from the client and a conveyance sent from the client to another client.

18. The apparatus according to claim 1, wherein the task comprises a current task.

19. The apparatus according to claim 18, wherein said computer readable program code is configured to alter one or more parameters of the task via altering selected from a group consisting of: stopping the task; rescheduling the task; slowing down the task; and postponing completion of the task.

20. A computer program product comprising:
a computer readable storage medium having computer readable program code embodied therewith, the computer readable program code comprising:
computer readable program code configured to assess a status of said client system;
computer readable program code configured to convey the status related to said client system from said client system to another network client;
computer readable program code configured to assimilate a status of another network client;
computer readable program code configured to determine whether a task of said client system satisfies one or more parameters impacting access to the share storage;
computer readable program code configured to alter one or more parameters of the task depending on whether or not the one or more parameters impacting access to the shared storage are not satisfied.

* * * * *